United States Patent
Nobakht et al.

(12)

(10) Patent No.: US 9,081,744 B2
(45) Date of Patent: Jul. 14, 2015

(54) TRELLIS RING NETWORK ARCHITECTURE

(75) Inventors: Ramin Nobakht, Laguna Niguel, CA (US); Daniel H. Wells, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 1272 days.

(21) Appl. No.: 11/100,796

(22) Filed: Apr. 6, 2005

(65) Prior Publication Data

US 2006/0230310 A1     Oct. 12, 2006

(51) Int. Cl.
| | |
|---|---|
| *G06F 15/00* | (2006.01) |
| *G06F 15/76* | (2006.01) |
| *G06F 15/173* | (2006.01) |
| *G06F 11/20* | (2006.01) |

(52) U.S. Cl.
CPC ...... *G06F 15/17337* (2013.01); *G06F 11/2007* (2013.01); *G06F 11/2051* (2013.01)

(58) Field of Classification Search
None
See application file for complete search history.

(56) References Cited

U.S. PATENT DOCUMENTS

| | | | |
|---|---|---|---|
| 5,613,069 A | | 3/1997 | Walker |
| 5,896,379 A | | 4/1999 | Haber |
| 6,848,006 B1 | * | 1/2005 | Hermann ............. 709/239 |

OTHER PUBLICATIONS

Raghavendra et al. (Reliable Loop Topologies for Large Local Computer Networks, Jan. 1985, pp. 46-55).*
Charles E. Deiserson et al., The Network Architecture of the Connection Machine CM-5, Mar. 21, 1994, Thinking Machines Corporation, Cambridge, MA, USA.
Robert Cypher and Luis Gravano, Requirements for Deadlock-Free, Adaptive Packet Routing, pp. 25-33, San Jose, CA, USA.
Maheswara R. Samatham, The De Bruijn Multiprocessor Network: A Versatile Parallel Processing and Sorting Network for VLSI, IEEE Transactions on Computers, vol. 38, No. 4.
Gustavo D. Pifarre et al., Fully Adaptive Minimal Deadlock-Free Packet Routing in Hypercubes, Meshes, and Other Networks:, IEEE Transactions on Computers, vol. 5, No. 3.

* cited by examiner

*Primary Examiner* — George Giroux
(74) *Attorney, Agent, or Firm* — Yee & Associates, P.C.

(57) ABSTRACT

A network for a large number of processing elements utilizes a trellis ring architecture to provide an efficient and fault tolerant data routing system. The processing elements (which may be chip-based processors, circuit cards, unit level assemblies, or computing devices) are interconnected together in an endless ring structure. In addition to the ring arrangement, the processing elements are interconnected via primary and additional trellis connections that reduce the average and/or the maximum number of network node hops between two processing elements in the network architecture.

21 Claims, 7 Drawing Sheets

TRELLIS RING NETWORK ARCHITECTURE

STATEMENT REGARDING FEDERALLY SPONSORED RESEARCH OR DEVELOPMENT

The United States government has certain rights in this invention as provided by the terms of contract number F30602-03-C-0166.

TECHNICAL FIELD

The present invention relates generally to computing architectures. More particularly, the present invention relates to a network architecture for a plurality of processing nodes.

BACKGROUND

The prior art is replete with network architectures for the interconnection of a plurality of computers, processors, or other computing devices. For example, some satellite radar applications may employ many interconnected integrated circuit ("IC") processing elements in an electronics enclosure of multiple circuit card assemblies. In addition, current design efforts for future aerospace, satellite, and commercial aircraft applications may contemplate the use of a large number of network-connected IC based processors. For such applications, the network connection topology should strive to minimize size, weight, power consumption, and be appropriate for use in a space flight environment. The topology should be scalable for use with different numbers of IC processing elements, and fault tolerant for long mission life without repair. The physical size of the network architecture should fit well within the practical packaging constraints, such as circuit card size, connector size, number of input/output pins, and electronic cabinet size.

One prior art network architecture for use in a satellite radar application employs a centralized switch network using a number of switches. In such an architecture, a switching element may include individual connections to a number of IC processing elements. In turn, the switching element is connected to a higher level (or centralized) switching element. Input/output connections may also be provided by these switching elements. The hierarchy of switches may be extended to include more than two levels to support a high number of IC processing elements. Unfortunately, the switches in this type of network architecture contain the switching intelligence and consume operating power, which can be problematic in a practical application. In addition, the use of hierarchical switching elements can cause input/output congestion at the higher level switches, resulting in slower performance. Furthermore, although such an architecture can accommodate larger numbers of processing elements via additional levels of switching, the addition of more switches necessarily results in an increase in operating power requirements.

Another prior art network architecture employs a fully connected mesh distributed topology, where each network node is directly connected to every other network node. Such a topology provides an optimized bandwidth across every possible path at the expense of increased operating power and physical size. Such an architecture is impractical because each network node would be required to have an extremely large number of network ports to support the mesh interconnections.

Accordingly, it would be desirable to have a network architecture that addresses connectivity issues in a network having a very large number of network nodes. In addition, it would be desirable to have a network architecture that significantly simplifies the switching, routing, and connectivity of the network, relative to conventional solutions, while providing high fault tolerance, satisfying conservative physical space requirements, satisfying low operating power specifications, and maintaining a low practical deployment cost. Furthermore, other desirable features and characteristics of the present invention will become apparent from the subsequent detailed description and the appended claims, taken in conjunction with the accompanying drawings and the foregoing technical field and background.

BRIEF SUMMARY

A network architecture configured in accordance with an embodiment of the invention efficiently partitions the overall network of processing elements into trellis rings of network nodes. The network nodes are connected to each other according to a logical partitioning scheme having fault tolerant capabilities. The network architecture need not employ a large number of hierarchical switching elements, thus facilitating a low cost and low power deployment.

The above and other aspects of the invention may be carried out in one form by a network architecture having a plurality of processing elements, each having at least three network ports (a first ring connection port, a second ring connection port, and at least one trellis connection port). In this architecture, the processing elements are coupled together, via the first and second ring connection ports, to form a ring architecture. In addition, some of the processing elements are cross-coupled together using the trellis connection ports.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
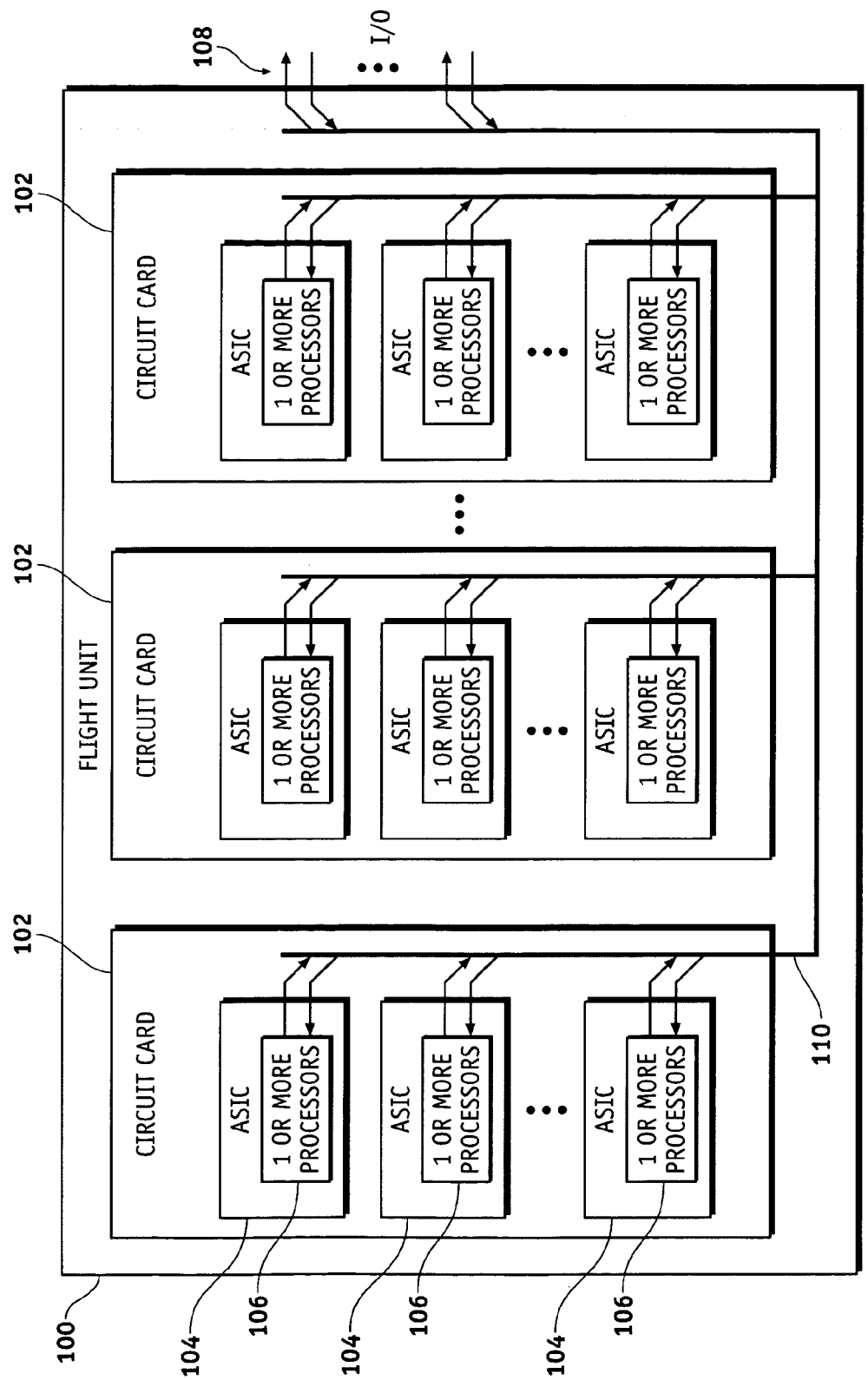
FIG. 1 is a schematic representation of an example arrangement of processing elements suitable for use in a practical embodiment of the invention.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., processor elements, memory elements, logic elements, look-up tables, or the like, which may carry out a variety of functions under the control of one or more microprocessors or other control devices. In addition, those skilled in the art will appreciate that the present invention may be practiced in conjunction with any number of computing or data processing systems and that the system described herein is merely one exemplary application for the invention.

For the sake of brevity, conventional techniques related to IC design, signal processing, data transmission, network control, network addressing, packet routing and switching, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

As used herein, a "network node" means any uniquely addressable or otherwise identifiable device, system, element, component, or portion thereof in a computing, processing, communication, or other network. As used herein, a "port" means an input and/or output point, lead, line, bus, device, element, component, or feature of a network node that allows the network node to be connected, coupled, or associated with another element or feature of the network (e.g., another network node, an input, or an output).

The following description refers to nodes, ports, or other features being "connected" or "coupled" together. As used herein, unless expressly stated otherwise, "connected" means that one feature is directly or indirectly connected to another feature, and not necessarily physically. Likewise, unless expressly stated otherwise, "coupled" means that one feature is directly or indirectly coupled to another feature, and not necessarily physically. Thus, although the figures may depict example arrangements of elements, additional intervening elements, devices, features, or components may be present in an actual embodiment (assuming that the functionality of the network architectures are not adversely affected).

FIG. 1 is a schematic representation of an example arrangement of processing elements suitable for use in a practical embodiment of the invention. In this regard, a network architecture configured in accordance with an embodiment of the invention can be implemented in connection with an Architecture Enhanced SBR Onboard Processor ("AESOP") deployed in a satellite radar system. As schematically depicted in FIG. 1, an AESOP flight unit 100 is a physical piece of electronics equipment that may reside on a satellite. Flight unit 100 may include or otherwise communicate with any number of circuit cards or "slices" 102, which may be interconnected to each other. In turn, each slice 102 may include any number of application specific integrated circuits ("ASICs") 104 and/or other chip-based or IC devices, which may be interconnected to each other. Furthermore, each ASIC 104 may include one or more processors 106 (not individually depicted in FIG. 1), which may be interconnected to each other. In practice, each processor 106 has an internal address or identifier that is unique in at least the local environment. The ellipses in FIG. 1 represent that any number of respective elements, i.e., one or more, may be utilized in a practical embodiment. In accordance with one example embodiment of the invention, each ASIC 104 includes eight to sixteen chip-based processors 106. Notably, however, there is no theoretical limit to the number of processors 106 per ASIC 104, the number of ASICs 104 per circuit card 102, or the number of circuit cards 102 per flight unit 100.

As used herein, a flight unit 100, a circuit card 102, an ASIC 104, a processor 106, any portion of such elements that is capable of functioning as a distinct or independent processing component, or any combination thereof, may be considered to be a "processing element" in a network architecture. Accordingly, a network architecture configured in accordance with an embodiment of the invention may refer to the arrangement of processors 106 within a single ASIC 104, the arrangement of ASICs 104 on a single circuit card 102, the arrangement of circuit cards 102 within flight unit 100, or the like. Indeed, although not shown in FIG. 1, multiple flight units 100 may also be interconnected using the network architecture topologies described herein. In alternate embodiments of the invention, the processing elements may be computer devices, systems, or components, e.g., a local area network ("LAN"), a metro area network ("MAN"), or a wide area network ("WAN") of client computers, server computers, personal computers, wireless computing devices, or the like.

In a practical embodiment, individual processors 106 within an ASIC 104 may be interconnected together and/or to other features of the respective ASIC 104 using links 110 that are realized as conductive elements formed using the semiconductor technology associated with the manufacture of ASICs 104. At the next level, ASICs 104 may be interconnected together and/or to other features of the respective circuit card 102 using links 110 that are realized as conductive traces formed on a printed circuit board or substrate, wire bonds, or the like. At the assembly level, circuit cards 102 may be interconnected together and/or to other features of the respective flight unit 100 using links 110 that are realized as conductive traces formed on a backplane structure, wire bonds, cables, a ribbon bus connector, or the like. For ease of illustration, the various interconnecting links 110 are simply depicted in FIG. 1. Ultimately, flight unit 100 may include any number of input/output ports or connections 108 that facilitate data transmission and routing between any network node in flight unit 100 and points external to flight unit 100, which may include additional networked flight units.

The routing of data through the network architecture may be performed using any number of suitable network addressing, switching, or routing schemes. In preferred embodiments of the invention, routing through the network architecture is accomplished using conventional Ethernet global destination addressing. In this regard, a local destination within an ASIC 104 may correspond to an end point (i.e., a processor 106) or a network input/output port for that ASIC 104. Although certainly not a requirement of the invention, the use of Ethernet global destination addressing is desirable because the details of such addressing are standardized and, therefore, easy to implement. In a practical implementation, the routing intelligence for the network architecture can be implemented in the individual processing elements that form the network, rather than in a centralized switch component or other control mechanism as implemented in the prior art architecture described above. For example, ASICs 104 preferably include switching functionality to allow packets to flow through the network by entering an ASIC 104 from a network port and being routed to another output port.

In practice, the network topology for AESOP applications connects hundreds of network nodes (e.g., processing elements) without using specialized switch ICs. In AESOP applications, the general network protocol is to send data messages as 10 Gigabit Ethernet packets. In the AESOP architecture, the goal is digital signal processing, for which the network data traffic can be intelligently structured to send more data through shorter routes and to send less data through longer routes, where a shorter route corresponds to relatively less network nodes traversed and a longer route corresponds to relatively more network nodes traversed. A network topology according to an embodiment of the invention minimizes or at least reduces the number of hops (or nodes) that message packets traverse in most practical situations, while still allowing connectivity to all network nodes. This results in improved network performance and network traffic routing, relative to prior art techniques that rely on hierarchical centralized or distributed switching.

A practical deployment of a network architecture configured in accordance with the invention can result in a reduction of operating power due to the elimination of hierarchical switches. The estimated power savings is nontrivial—30% to 50% savings relative to the conventional architecture. In addition, circuit cards 102 can be reduced in size in a practical deployment (or have additional functionality added while maintaining the same size) due to the deletion of switch ICs and supporting circuits, which is approximately 5% of the area of each circuit card 102. Furthermore, using this approach saves the cost and time delay associated with the development of a suitable multi-port, 10-Gigabit Ethernet switch IC that is space flight qualified.

Figure 2:
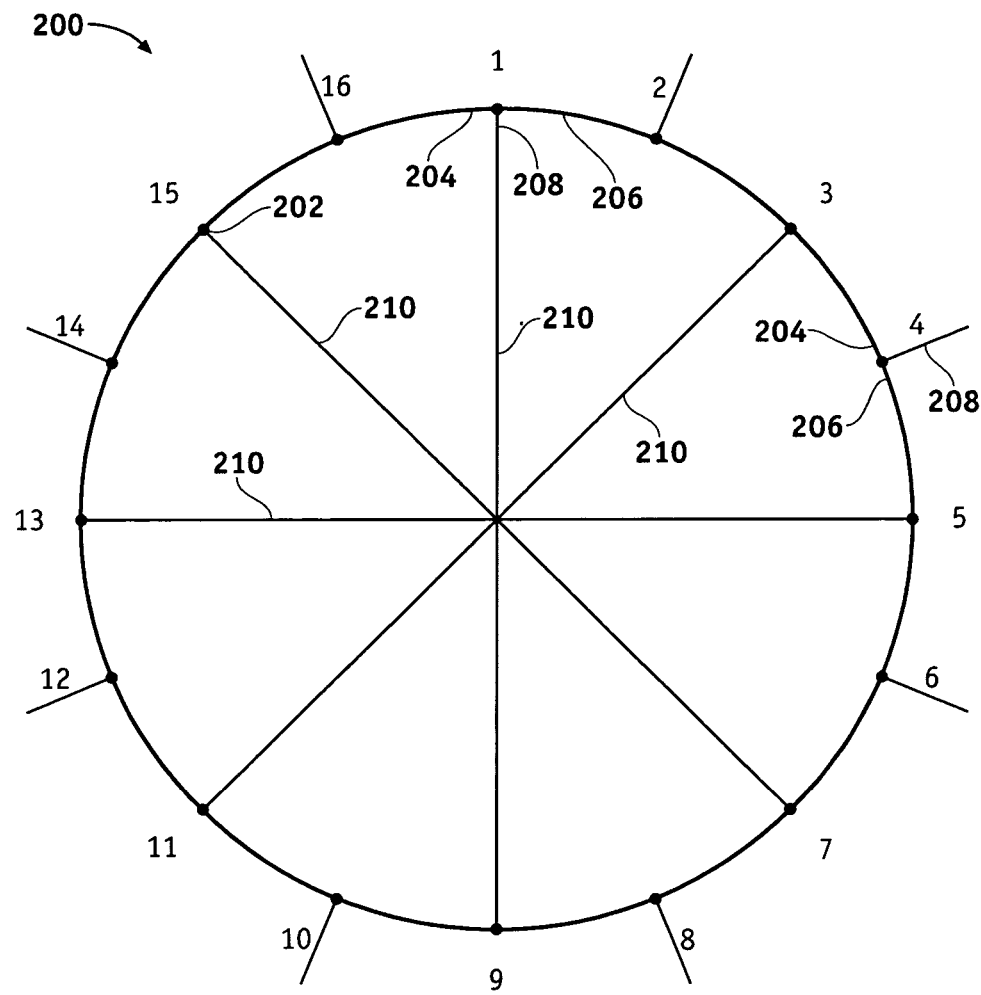
FIG. 2 is a diagram of an example circuit card having processor elements configured in a network architecture.

FIG. 2 is a diagram of an example circuit card 200 having processor elements configured in a network architecture according to one example embodiment of the invention. In this example, each processor element is an ASIC 202, and circuit card 200 includes sixteen ASICs 202 (for ease of description, each ASIC 202 is depicted as a numbered dot in FIG. 2). In practice, each ASIC 202 includes at least three network ports, which enables each ASIC 202 to function as a network switch. In the example embodiment of the invention shown in FIG. 2, each ASIC 202 includes three network ports (in FIG. 2, a line to/from an ASIC 202 represents a network port). It should be appreciated that a practical network topology may utilize processing elements that include any number of network ports, and that the number of network ports per processing element need not be the same throughout the network architecture. The network partitioning techniques described herein can be extended to such practical network topologies and the example shown in FIG. 2 is not intended to limit the application of the invention in any way.

In the example embodiment, each ASIC 202 includes a first ring connection port 204, a second ring connection port 206, and a third or "trellis connection" port 208. These ports are identified for the ASICs numbered "1" and "4" in FIG. 2. The ASICs 202 are coupled together, via the first and second ring connection ports, to form a ring architecture. As used herein, a "ring architecture" is a topology in which each network node is connected to two neighboring network nodes in a point-to-point manner without having a true endpoint. Of course, the actual physical layout of circuit card 200 need not be circular in shape and the term "ring" is not intended to limit the shape or physical configuration of circuit card 200 in any way. Furthermore, the techniques described herein may be equivalently applied to a "broken ring" topology where one or more network nodes from a ring architecture are missing, inactive, or failed.

A trellis connection port 208 for a given ASIC 202 may be utilized to cross-couple two ASICs 202 of circuit card 200 together, thus establishing a trellis connection 210 between the two interconnected ASICs 202. FIG. 2 depicts four trellis connections 210, each having a ring hop length equal to eight. As used herein, "ring hop length" means the number of network nodes that would otherwise be traversed around the ring architecture absent a trellis connection. For example, in FIG. 2, a data packet originating at ASIC number "1" would normally travel through eight ring network nodes before arriving at ASIC number "9"—thus, the ring hop length of the corresponding trellis connection 210 between ASIC number "1" and ASIC number "9" is eight, even though the actual hop length is only one. Indeed, the ring hop length of all trellis connections 210 shown in FIG. 2 is eight. In contrast, the ring hop length between any two neighboring ASICs 202 on the ring architecture is equal to one. The maximum number of hops between any two ASICs 202 in the simple ring architecture itself would be N/2, where N is the integer number of ASICs 202 in the ring (for example, if only the simple ring topology were present, it would require eight hops to traverse between ASIC number "5" and ASIC number "13"). Notably, trellis connections 210 significantly reduce the maximum number of actual hops in circuit card 200, and the maximum number of hops is reduced to provide a worst case performance of only four hops (for example, the path between ASIC number "1" and ASIC number "12").

A trellis connection port 208 for a given ASIC 202 may be utilized as a circuit card input/output port or as a connection point for that ASIC 202. In this regard, a trellis connection port 208 may be reserved for use as an input for circuit card 200, an output for circuit card 200, or a combined input/output for circuit card 200. For instance, the trellis connection port 208 for ASIC number "4" serves as a circuit card input/output port. Thus, depending upon the particular configuration, topology, and application of the network architecture, trellis connection ports 208 may be utilized to establish trellis connections (of any ring hop length), circuit card input connections, and/or circuit card output connections for the processing elements.

Although certainly not a requirement of the invention, the example circuit card 200 establishes trellis connections 210 for every other ASIC 202 on the ring structure. The third network port of the remaining ASICs 202 is utilized as a circuit card input/output port. In a practical deployment, the eight input/output ports on circuit card 200 function as connection ports to a backplane structure located in a higher level component, e.g., flight unit 100 shown in FIG. 1. In this manner, any number of the input/output ports on circuit card 200 can be connected to the input/output ports on other circuit cards of flight unit 100. Alternatively or additionally, any number of the input/output ports on circuit card 200 can serve as higher level input/output ports for flight unit 100 itself. In one example embodiment, each circuit card 200 dedicates two of its input/output ports for use as higher level data input and output. This allows circuit card 200 to support the potentially high data rate requirements for the data being used by the lower level processing elements in practical deployments.

Figure 3:
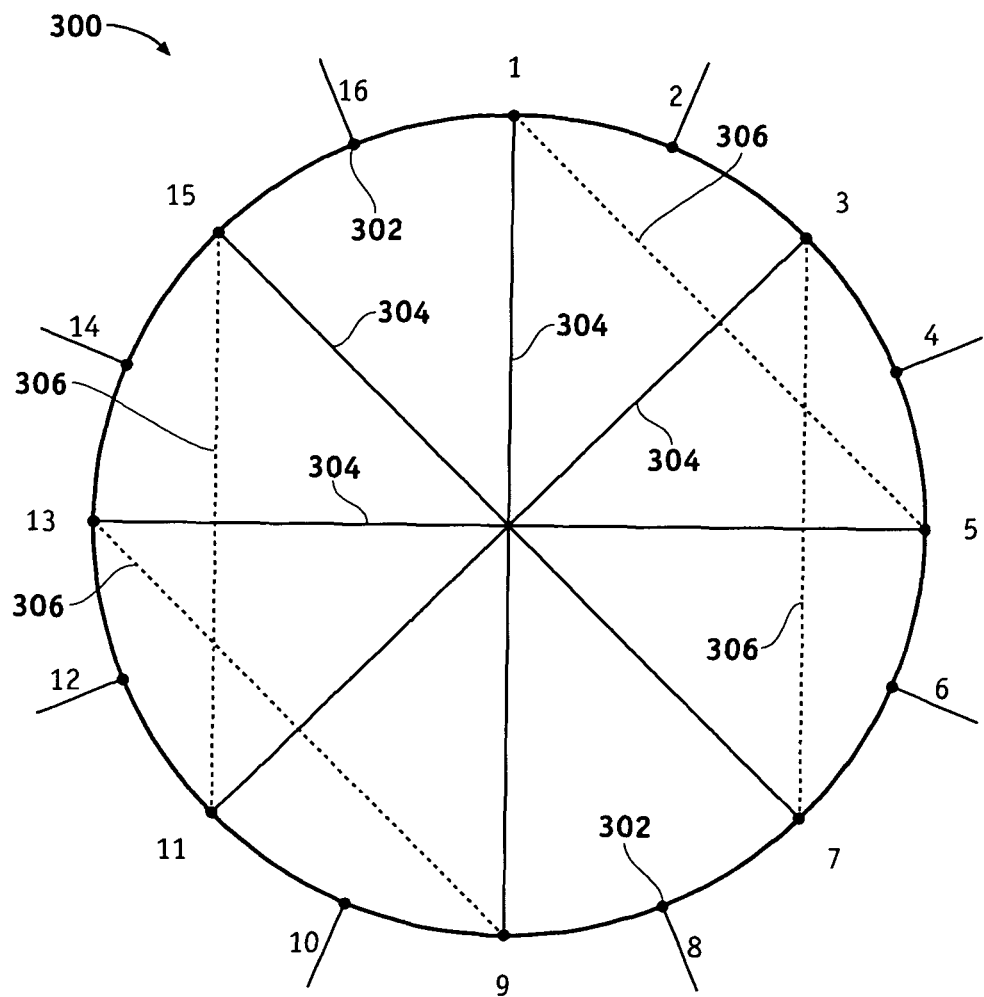
FIG. 3 is a diagram of another example circuit card having processor elements configured in a network architecture.

FIG. 3 is a diagram of an example circuit card 300 having processor elements configured in a network architecture according to an alternate embodiment of the invention. Circuit card 300 shares certain aspects and features with circuit card 200. Such shared features will not be redundantly described herein. Briefly, circuit card 300 includes sixteen ASICs 302, each having at least three network ports, interconnected to form a ring architecture. Circuit card 300 includes four trellis connections 304, each having a ring hop length of eight. In addition to trellis connections 304, circuit card 300 also includes four additional trellis connections 306 (shown as dashed lines to distinguish them from trellis connections 304). In contrast to trellis connections 304, each of the secondary trellis connections 306 has a ring hop length of only four. Although only four secondary trellis connections 306 are shown in FIG. 3, circuit card 300 may be suitably configured to include any number of such secondary trellis connections between the ASICs 302.

In contrast to ASICs 202 used in circuit card 200, at least some of the ASICs 302 used in circuit card 300 include more than three network ports to facilitate the establishment of the additional trellis connections. For example, ASIC number "1" includes four network ports because it supports one of the additional trellis connections 306. It should be appreciated that the number of required network ports per ASIC 302 may vary depending upon the particular network topology and the number of trellis connections (which may be of any ring hop length) supported by the ASIC 302. Although circuit card 300 only includes additional trellis connections 306 having a ring hop length of four, the ring architecture may be further subdivided using shorter trellis connections if so desired.

Fault tolerance may be defined as the number of failing connections or faults from any given network node (e.g., a circuit card or an ASIC) which, in the best case, will not create additional hops from the node to any other node within the same topology, and at the minimum, maintains a network connection from the node to any other node within the same topology, but with additional hops required. The additional/secondary trellis connections are desirable to further reduce the average and/or the maximum number of hops between ASICs 302 and to provide a measure of fault tolerance to circuit card 300. In other words, if one of trellis connections 304 fails, or if an ASIC 302 fails, the other connections, including the additional trellis connections 306, can provide alternate routing. In a practical embodiment, the additional trellis connections 306 may be configured as redundant connections that remain inactive until needed to replace a failed primary trellis connection 304.

Figure 4:
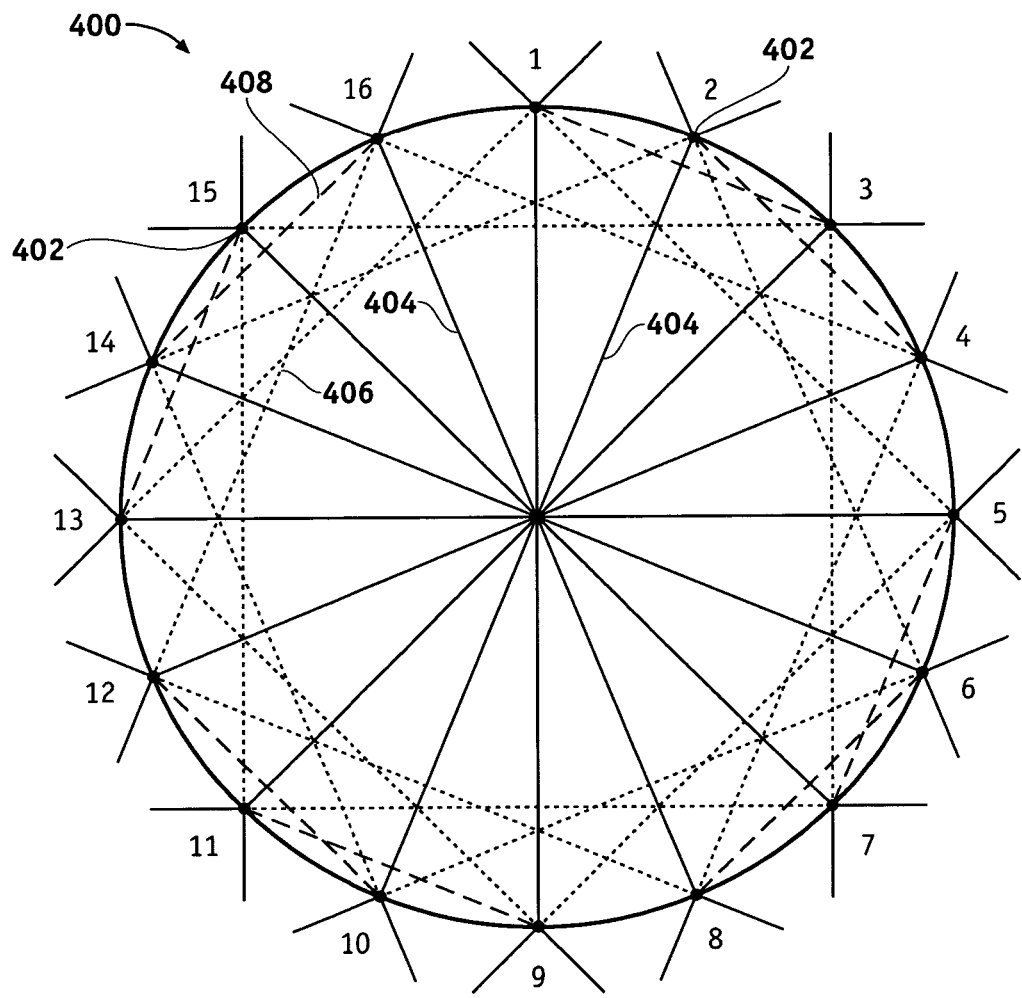
FIG. 4 is a diagram of an example processing unit having circuit cards configured in a network architecture.

FIG. 4 is a diagram of a processing unit 400 configured in accordance with an example embodiment of the invention. Processing unit 400 may represent, for example, flight unit 100 shown in FIG. 1. Processing unit 400 includes a plurality of circuit cards 402 that are interconnected together using the network partitioning technique described herein. In this example, processing unit 400 includes sixteen circuit cards 402 connected to each other to form a ring architecture (each circuit card 402 is represented by a circle on the perimeter of the ring structure). Each circuit card 402 may be configured as described above in connection with FIG. 2 or FIG. 3.

In this example embodiment, each circuit card 402 includes eight network ports, including two processing unit input/output ports, two ring connection ports, and four trellis connection ports. To significantly reduce the average and/or the maximum number of hops required for data communication, each circuit card 402 uses a trellis connection port to establish a trellis connection 404 to the farthest circuit card 402 on the ring structure. In this regard, processing unit 400 includes eight primary trellis connections 404, each having a ring hop length corresponding to eight circuit cards 402. The remaining three trellis connection ports for each circuit card 402 are connected such that the ring architecture is further subdivided with additional trellis connections, which may be of shorter ring hop lengths. For example, processing unit 400 includes a number of trellis connections 406 having a ring hop length corresponding to four circuit cards 402, and a number of trellis connections 408 having a ring hop length corresponding to two circuit cards 402. Of course, the exact interconnection and partition strategy depends on the number of circuit cards, the number of unit-level input and output ports, the number of network ports per circuit card, and other practical considerations.

Figure 5:
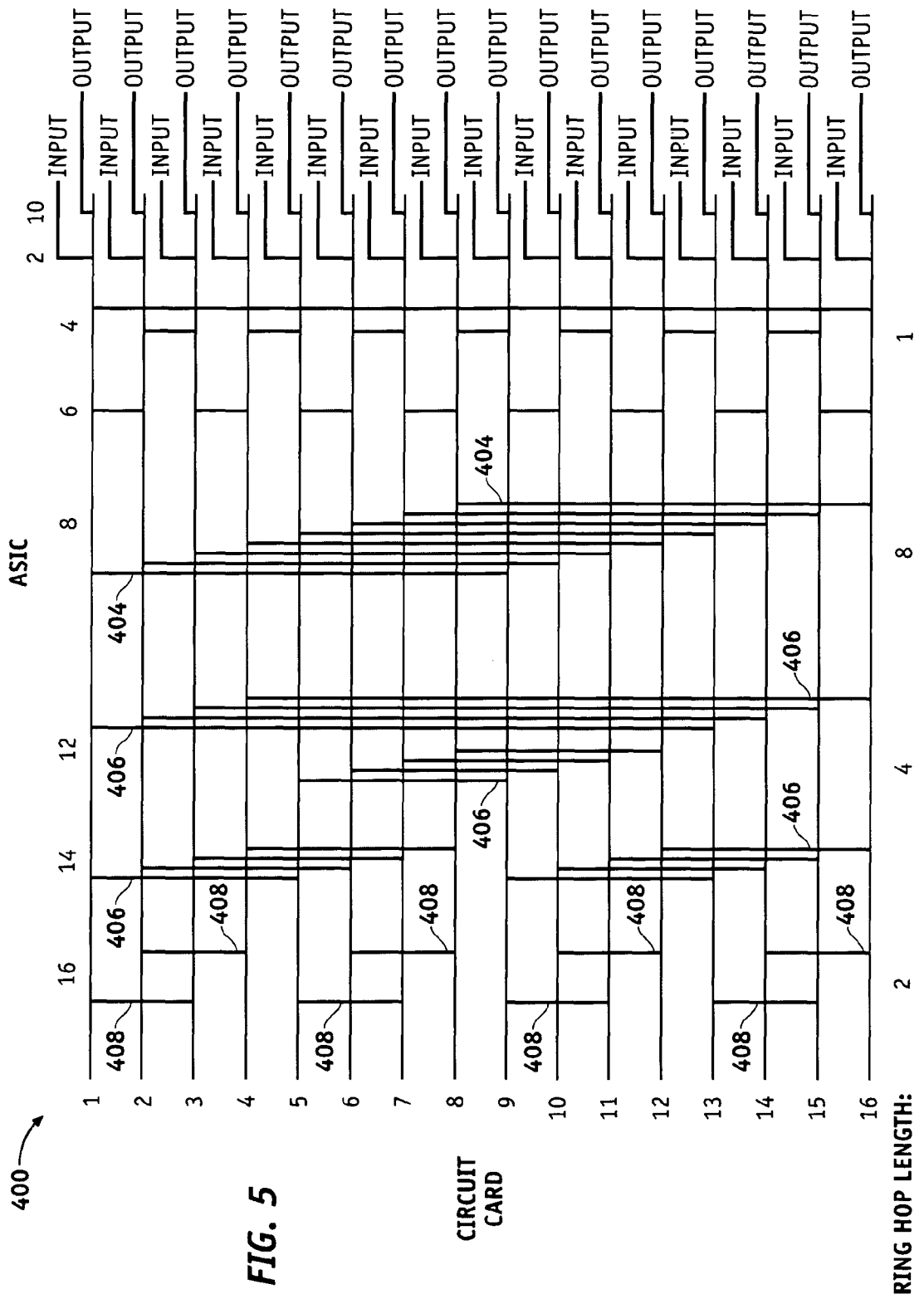
FIG. 5 is a diagram that shows one example of how the processor elements can be related to the circuit cards in the processing unit shown in FIG. 4.

FIG. 5 is an alternate diagram of processing unit 400 shown in FIG. 4, showing the interconnections between circuit cards (i.e., slices) and the ASICs providing the circuit card level interconnections. It should be appreciated that the specific topology represented by FIG. 5 is merely one possible example of how processing unit 400 might be interconnected, and that the topology of FIG. 5 is not intended to limit or narrow the application of the invention in any way. This example embodiment employs sixteen ASICs per circuit card and sixteen circuit cards for processing unit 400. Consistent with the examples shown in FIGS. 2-4, the ASICs on each circuit card are preferably interconnected in a trellis ring configuration, and the circuit cards for processing unit 400 are preferably interconnected in a trellis ring configuration. In this regard, the vertical lines in FIG. 5 represent connections (e.g., ring connections or trellis connections) between circuit cards.

The example processing unit 400 shown in FIG. 5 designates ASIC number "4" and ASIC number "6" from each circuit card for purposes of establishing the ring connections for the high level ring architecture of processing unit 400. Consequently, FIG. 5 depicts the ring connections (each having a ring hop length of one) between neighboring circuit cards, including the ring connection between circuit card number "1" and circuit card number "16." Processing unit 400 designates ASIC number "8" from each circuit card for purposes of establishing primary trellis connections 404 (each having a ring hop length of eight) between circuit cards. In addition, processing unit 400 designates ASIC number "12" and ASIC number "14" from each circuit card for purposes of establishing additional trellis connections 406 (each having a ring hop length of four) between circuit cards. Processing unit 400 also designates ASIC number "16" from each circuit card for purposes of establishing additional trellis connections 408 (each having a ring hop length of two) between circuit cards. Finally, processing unit 400 designates ASIC number "2" from each circuit card as a processing unit input port, and designates ASIC number "10" from each circuit card as a processing unit output port. Therefore, processing unit 400 includes a total of 32 processing unit input/output ports. Odd numbered ASICs are not identified in FIG. 5 because, in this example, the odd numbered ASICs are reserved for internal connections at the circuit card level (see FIG. 2).

Notably, a network topology according to the example embodiment of the invention connects all IC-based processors on a circuit card assembly in a manner that does not require separate switch ICs. In addition, the topology results in a reduction in the average and/or the maximum number of hops as compared to an equivalent topology that employs centralized or no fully connected mesh distributed switches. In the example embodiment, the maximum number of hops for a packet to traverse from one ASIC to another ASIC on the circuit card is only four hops, and the average from one ASIC to another ASIC on the circuit card is only 2.5 hops. Generally, the network partitioning scheme described herein effectively reduces the average and/or the maximum number of hops between processing elements. The unit connection topology provides direct connections from a circuit card to some, but not all, of the other circuit cards in the unit. For connections that are not direct, other circuit cards can be utilized to provide an intermediate connection path.

It should be understood that the concepts described above can be extended for application at any "level" of a hierarchical network architecture. For example, any of the general topologies shown in FIG. 24 may represent the internal architecture of an ASIC, a circuit card structure, a unit assembly, and so on.

Figure 6:
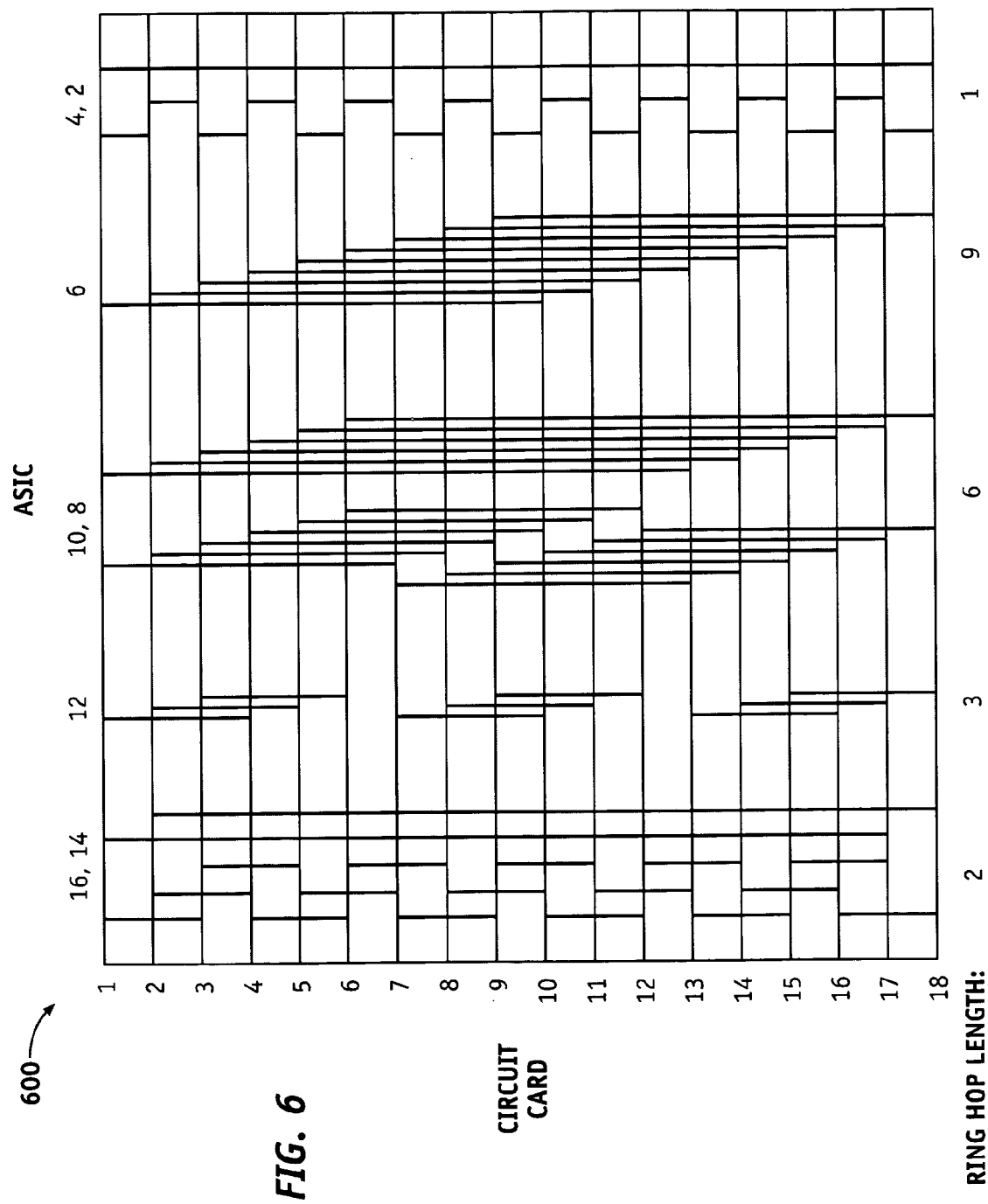
FIG. 6 is a diagram that shows an example of how processor elements can be related to circuit cards in another processing unit.

FIG. 6 is a diagram of a processing unit 600 configured in accordance with an alternate embodiment of the invention. It should be appreciated that the specific topology represented by FIG. 6 is merely one possible example of how processing unit 600 might be interconnected, and that the topology of FIG. 6 is not intended to limit or narrow the application of the invention in any way. Processing unit 600 includes eighteen, rather than sixteen, circuit cards. Each circuit card associated with processing unit 600 includes sixteen ASICs, as described above in connection with processing unit 400. FIG. 6 illustrates the manner in which circuit cards are interconnected in processing unit 600. Notably, processing unit 600 includes ring connections (each representing a single hop) between neighboring circuit cards, primary trellis connections (each having a ring hop length of nine), and additional trellis connections (having ring hop lengths of six, three, and two). For the sake of clarity, FIG. 6 does not depict the input/output ports of processing unit 600.

Figure 7:
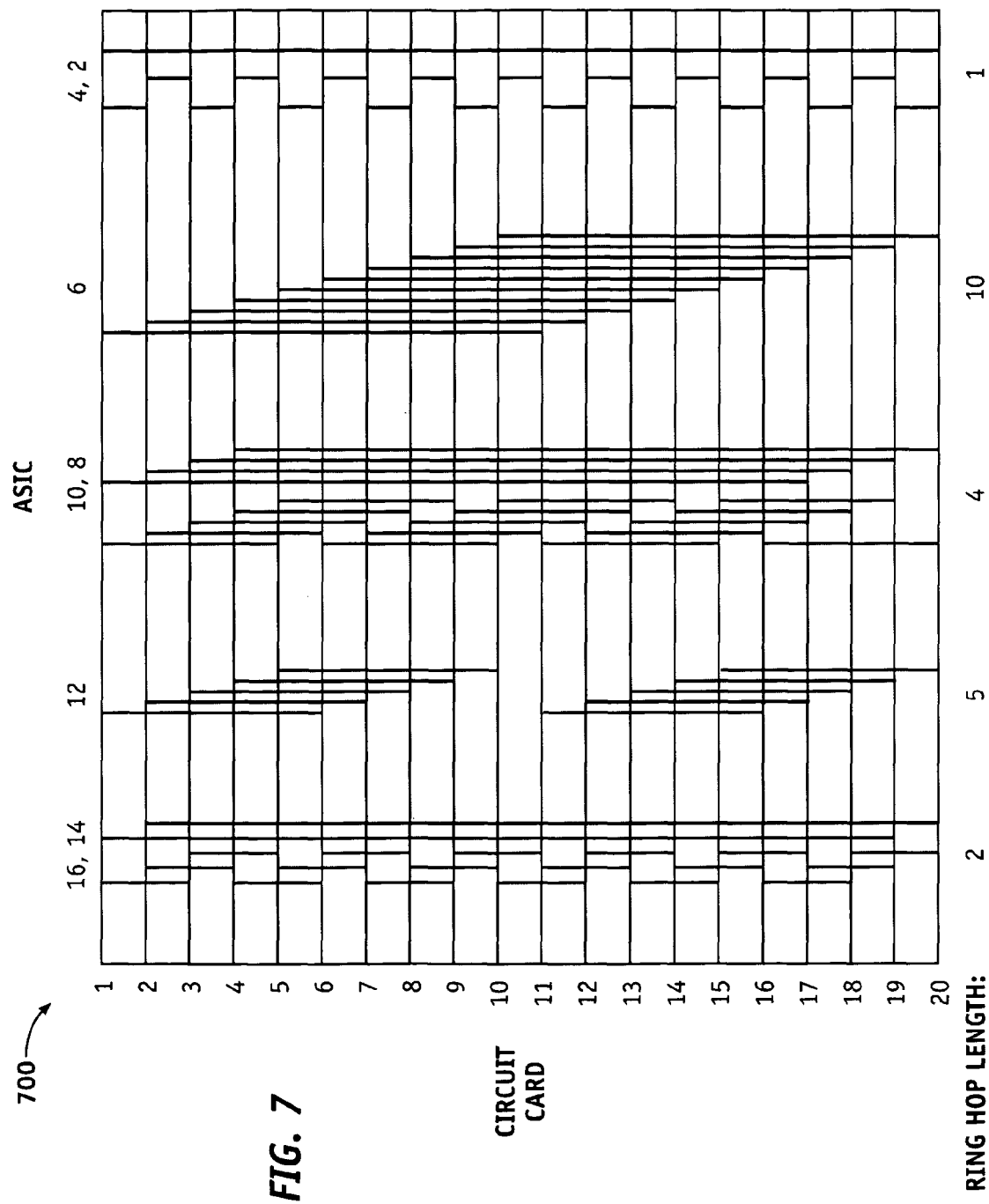
FIG. 7 is a diagram that shows an example of how processor elements can be related to circuit cards in yet another processing unit.

FIG. 7 is a diagram of a processing unit 700 configured in accordance with yet another alternate embodiment of the invention. It should be appreciated that the specific topology represented by FIG. 7 is merely one possible example of how processing unit 700 might be interconnected, and that the topology of FIG. 7 is not intended to limit or narrow the application of the invention in any way. Processing unit 700 includes twenty, rather than sixteen, circuit cards. Each circuit card associated with processing unit 700 includes sixteen ASICs, as described above in connection with processing unit 400. FIG. 7 illustrates the manner in which circuit cards are interconnected in processing unit 700. Notably, processing unit 700 includes ring connections (each representing a single hop) between neighboring circuit cards, primary trellis connections (each having a ring hop length of ten), and additional trellis connections (having ring hop lengths of five, four, and two). For the sake of clarity, FIG. 7 does not depict the input/output ports of processing unit 700.

Generally, the network architecture partitioning technique described herein can be applied to a network architecture having any integer number (N) of processing elements interconnected to form a ring structure. In practice, N will be greater than three and, in preferred embodiments, N will be an even number. In the straightforward case where N is an even number, the ring hop length of the primary trellis connections is equal to the second largest divisor of N, which can be calculated by dividing N by two. The ring hop length of the secondary trellis connections is equal to the third largest divisor of N, the ring hop length of the tertiary trellis connections is equal to the fourth largest divisor of N, and so on. This process can be repeated until all of the integer divisors of N have been consumed or until the number of network ports for the given processing elements has been exhausted. For the example depicted in FIG. 5, N=16 and the integer divisors are 8, 4, and 2. For the example depicted in FIG. 6, N=18 and the integer divisors are 9, 6, 3, and 2. For the example depicted in FIG. 7, N=20 and the integer divisors are 10, 5, 4, and 2. Alternatively, the primary trellis connections can be established using connections having a ring hop length equal to any of the integer divisors of N. In other words, the primary trellis connections need not always have a ring hop length equal to the second largest divisor of N. Similarly, the secondary, tertiary, and additional trellis connections may also be established using connections having ring hop lengths equal to any of the integer divisors of N.

If N is a non-prime odd number, then a similar partitioning technique can be utilized. Briefly, the integer divisors of N, (N−1), or (N+1) are identified, and the primary trellis connections will have a ring hop length equal to the second largest integer divisor, the secondary trellis connections will have a ring hop length equal to the third largest integer divisor, the tertiary trellis connections will have a ring hop length equal to the fourth largest integer divisor, and so on. As mentioned above, it should be appreciated that any of the trellis connections may be established using connections having ring hop lengths equal to any of the integer divisors of N, (N−1), or (N+1).

If, however, N is a prime number, then the following modified partitioning technique may be followed to construct an appropriate trellis ring network architecture. In particular, the ring hop lengths of the trellis connections are calculated by determining the integer divisors of the number (N−1) or (N+1), which by definition will be an even number for N>2. Thus, if N=29, then the integer divisors will be 14, 7, 4, and 2 for (N−1) or the integer divisors will be 15, 10, 6, 5, 3, and 2 for (N+1); if N=23, then the integer divisors will be 11 and 2 for (N+1) or the integer divisors will be 12, 8, 6, 4, 3, and 2 for (N+1); if N=33, then the integer divisors will be 16, 8, 4, and 2 for (N−1) or the integer divisors will be 17 and 2 for (N+1). Of course, a prime number of processing elements may result in an "asymmetric" trellis ring topology, and the specific manner in which the trellis connections are established will reflect this characteristic. As mentioned above, the primary trellis connections can be established using connections having a ring hop length equal to any of the integer divisors of N. In other words, the primary trellis connections need not be created with links having a ring hop length equal to the second largest divisor of N. Similarly, the secondary, tertiary, and additional trellis connections may also be established using connections having ring hop lengths equal to any of the integer divisors of N.

In a practical packet network environment, the packet format and network topology will be highly flexible, leveraging software and table look-up methodologies. In connection with packet assembly and routing, shortest path routes will be determined a priori and translated to table entries. The source processor will create the packet and include the information necessary for any element within the network architecture to determine routing by table look-up. In one practical embodiment, the routing information is a Global Destination ID (MAC Address). Regarding practical switching methodologies, the example ASICs described herein have three network input/output ports. Thus, any ASIC can control packet switching to one of its three ports by interrogating the table entry for that ASIC. In practice, the selected port will be part of the shortest route to a given Global Destination ID. The exact table entry or switch port used will be determined according to the particular table routing methodology employed by the network architecture.

It should be appreciated that table based routing is only one practical example. Many other suitable routing schemes may be used. For example, packet based routing may be used, where the packet information will provide the routing details. The down side to this approach is that the size of the packet will be increased (resulting in lower throughput). The upsides to this approach are that: (1) no special table based routing hardware/software is required; and (2) routing is flexible such that packets with different "priority" may be sent via different routes to the same destination processor element.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A network architecture comprising:
    an integer number (N) of processing elements forming a ring architecture, wherein N is greater than 3, and each of said processing elements having at least three network ports;
    a first number of trellis connections, each coupling two of said processing elements and each having a first ring hop length equal to a second largest divisor of N when N is an even number, and equal to a second largest divisor of N, (N−1), or (N+1) when N is a non-prime odd number, and equal to a second largest divisor of (N−1) or (N+1) when N is a prime number; and
    a second number of trellis connections, each coupling two of said processing elements and each having a second ring hop length equal to the third largest divisor of N when N is an even number, and equal to the third largest divisor of N, (N−1), or (N+1) when N is a non-prime odd number, and equal to the third largest divisor of (N−1) or (N+1) when N is a prime number;
    wherein the first number of trellis connections and the second number of trellis connections are further configured to establish direct connections from each of the N processing elements to less than (N−1) of the other processing elements in the network as a result of a configuration of the first number of trellis connections and the second number of trellis connections established by the first ring hop length and the second ring hop length; and
    wherein second trellis connections of the second number of trellis connections are configured as redundant connections that remain inactive until needed to replace a failed first trellis connection of the first number of trellis connections.

2. A network architecture according to claim 1, further comprising a third number of trellis connections, each coupling two of said processing elements and each having a third ring hop length equal to a fourth largest divisor of N when N is an even number, and equal to a fourth largest divisor of N, (N−1), or (N+1) when N is a non-prime odd number, and equal to a fourth largest divisor of (N−1) or (N+1) when N is a prime number.

3. A network architecture according to claim 1, wherein at least one of said processing elements has an input/output connection via one of said at least three network ports.

4. A network architecture according to claim 1, wherein each of said processing elements comprises a chip-based processor.

5. A network architecture according to claim 1, wherein the first ring hop length excludes one, and wherein the second hop length excludes one.

6. A network architecture according to claim 1, wherein each of said processing elements comprises an application specific integrated circuit ("ASIC") containing a plurality of processors.

7. The network architecture of claim 1 wherein the first number of trellis connections and the second number of trellis connections comprise all trellis connections of the network architecture.

8. The network architecture of claim 2 wherein the first number of trellis connections, the second number of trellis connections, and the third number of trellis connections comprise all trellis connections of the network architecture.

9. The network architecture of claim 1 wherein the configuration is scalable and extendable for an application at a level of hierarchical network architecture.

10. The network architecture according to claim 1,
    wherein the second largest divisor and the third largest divisor are obtained from a set of integer divisors identified for one of N, (N−1), and (N+1).

11. A processor circuit card comprising:
    an integer number (N) of integrated circuit processor devices forming a ring architecture, wherein N is greater than 3, and each of said integrated circuit processor devices having at least three network ports;
    a number of said integrated circuit processor devices being coupled together via:
        a first number of trellis connections to said network ports, each of said first number of trellis connections having a first ring hop length equal to a second largest divisor of N when N is an even number, and equal to a second largest divisor of N, (N−1), or (N+1) when N is a non-prime odd number, and equal to a second largest divisor of (N−1) or (N+1) when N is a prime number; and
        a second number of trellis connections to said network ports, each of said second number of trellis connections having a second ring hop length equal to the third largest divisor of N when N is an even number, and equal to the third largest divisor of N, (N−1), or (N+1) when N is a non-prime odd number, and equal to the third largest divisor of (N−1) or (N+1) when N is a prime number; and
    wherein the first number of trellis connections and the second number of trellis connections are further configured to establish direct connections from each of the N integrated circuit processor devices to less than (N−1) of the other integrated circuit processor devices in the processor circuit card as a result of a configuration of the first number of trellis connections and the second number of trellis connections established by the first ring hop length and the second ring hop length; and
    a number of said integrated circuit processor devices having one of said at least three network ports designated as an input/output port for said circuit card;
    wherein second trellis connections of the second number of trellis connections are configured as redundant connections that remain inactive until needed to replace a failed first trellis connection of the first number of trellis connections.

12. A processor circuit card according to claim 11, wherein the number of integrated circuit processor devices are further coupled together via a third number of trellis connections to said network ports, wherein each of said third number of trellis connections have a third ring hop length equal to a fourth largest divisor of N when N is an even number, and equal to the fourth largest divisor of N, (N−1), or (N+1) when N is a non-prime odd number, and equal to the fourth largest divisor of (N−1) or (N+1) when N is a prime number.

13. A method for partitioning a network architecture having an integer number (N) of processing elements, each of said processing elements having at least three network ports, said method comprising:
- forming a ring architecture with said processing elements;
- determining divisors for N if N is an even number, or divisors for N, (N−1), or (N+1) if N is a non-prime odd number, or divisors for (N−1) or (N+1) if N is a prime number;
- establishing a first number of trellis connections, each coupling two of said processing elements and each having a ring hop length equal to a first divisor obtained from said determining step; and
- establishing a second number of trellis connections, each coupling two of said processing elements and each having a ring hop length equal to a second divisor obtained from said determining step;
- wherein second trellis connections of the second number of trellis connections are configured as redundant connections that remain inactive until needed to replace a failed first trellis connection of the first number of trellis connections.

14. A method according to claim 13, further comprising establishing a third number of trellis connections, each coupling two of said processing elements and each having a ring hop length equal to a third divisor obtained from said determining step.

15. A method according to claim 13, further comprising establishing input/output connections, via said network ports, for a number of said processing elements.

16. A method according to claim 15, wherein said first number of trellis connections are utilized for a first subset of said processing elements, and wherein said input/output connections are utilized for a second subset of said processing elements.

17. The method of claim 13 further comprising:
- determining whether N is an even number, a non-prime odd number, or a prime number.

18. The method of claim 17 further comprising:
- responsive to N being an even number, determining divisors for N.

19. The method of claim 17 further comprising:
- responsive to N being a non-prime odd number, determining divisors for N, (N−1), or (N+1).

20. The method of claim 17 further comprising:
- responsive to N being a prime number, determining divisors for (N−1) or (N+1).

21. The method of claim 13 further comprising:
- further configuring the first number of trellis connections and the second number of trellis connections such that a number of hops is reduced for the network architecture, relative to a topology that employs one of centralized switches and no fully connected mesh distribution switches, as a result of the establishing.

* * * * *